(12) United States Patent
Xu et al.

(10) Patent No.: US 7,050,422 B2
(45) Date of Patent: May 23, 2006

(54) SYSTEM AND METHOD FOR PROVIDING REAL TIME CONNECTIONLESS COMMUNICATION OF MEDIA DATA THROUGH A FIREWALL

(75) Inventors: Charles Xu, Santa Clara, CA (US); Paul Pay-Lun Ju, Cupertino, CA (US); Fu-Hua Liu, Scarsdale, NY (US); Chen-Huei Chang, Milpitas, CA (US); Shih-An Cheng, Cupertino, CA (US)

(73) Assignee: Innomedia Pte, Ltd., Singapore (SG)

( * ) Notice: Subject to any disclaimer, the term of this patent is extended or adjusted under 35 U.S.C. 154(b) by 1035 days.

(21) Appl. No.: 09/977,438

(22) Filed: Oct. 15, 2001

(65) Prior Publication Data

US 2002/0114322 A1   Aug. 22, 2002

Related U.S. Application Data

(63) Continuation-in-part of application No. 09/788,865, filed on Feb. 20, 2001, and a continuation-in-part of application No. 09/819,492, filed on Mar. 28, 2001.

(51) Int. Cl.
    *H04L 12/66*   (2006.01)
(52) U.S. Cl. ................................... 370/352
(58) Field of Classification Search ............. None
    See application file for complete search history.

(56) References Cited

U.S. PATENT DOCUMENTS

| | | | |
|---|---|---|---|
| 5,799,068 A | 8/1998 | Kikinis et al. | |
| 5,916,302 A | 6/1999 | Dunn et al. | |
| 6,075,783 A | 6/2000 | Voit | |
| 6,321,253 B1 | 11/2001 | McKeen et al. | |
| 6,697,377 B1 * | 2/2004 | Ju et al. | 370/466 |
| 6,925,487 B1 * | 8/2005 | Kim | 370/466 |
| 2002/0141389 A1 * | 10/2002 | Fangman et al. | 370/352 |
| 2003/0007486 A1 * | 1/2003 | March et al. | 370/389 |
| 2003/0065817 A1 * | 4/2003 | Benchetrit et al. | 709/245 |
| 2004/0037268 A1 * | 2/2004 | Read | 370/352 |
| 2004/0252683 A1 * | 12/2004 | Kennedy et al. | 370/389 |

FOREIGN PATENT DOCUMENTS

| | | |
|---|---|---|
| EP | 0781015 A | 6/1997 |
| EP | 0841831 A | 5/1998 |
| EP | 0966 145 A | 12/1998 |

OTHER PUBLICATIONS

Alan B. Johnston, SIP, Understanding the Session Initiation Protocal, 2002, pp. 0-52.

\* cited by examiner

*Primary Examiner*—Chi Pham
*Assistant Examiner*—Anh-Vu Ly
(74) *Attorney, Agent, or Firm*—Timothy P. O Hagan

(57) ABSTRACT

A method for communicating real time media data between a first client and a second client across a packet switched data network is provided. The method includes receiving an indication of a first client network address for use as a destination network address for sending media datagrams to the first client. A media datagram originated by the first client is also received. A comparison between the first client network address and a source network address extracted from the media datagram originated by the first client is made. A media datagram is sent to the first client using the source network address if the source network address and the first client network receiving address are not the same and the media datagram is sent to the first client using the first client network address if the source network address and the first client network address are the same.

16 Claims, 9 Drawing Sheets

SYSTEM AND METHOD FOR PROVIDING REAL TIME CONNECTIONLESS COMMUNICATION OF MEDIA DATA THROUGH A FIREWALL

CROSS REFERENCE TO RELATED APPLICATIONS

The present application is a continuation in part of U.S. patent application Ser. No. 09/788,865 entitled Method for Communicating Audio Data in a Packet Switched Network filed on Feb. 20, 2001 and is a continuation in part of U.S. patent application Ser. No. 09/819,492 entitled System and Method for Determining a Connectionless Communication Path for Communicating Audio Data through an Address and Port Translation Device filed on Mar. 28, 2001. Both of the above referenced patent application are incorporated herein in their entirety.

TECHNICAL FIELD

The present invention relates to communicating media data in a packet switched data network and, more specifically, to establishing and maintaining real time media data sessions through a firewall.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

More recently, the copper wires, or trunk lines between switching stations have been replaced with fiber optic cables. A computing device digitizes the analog signals and formats the digitized data into frames such that multiple conversations can be transmitted simultaneously on the same fiber. At the receiving end, a computing device reforms the analog signals for transmission on copper wires. Twisted pair copper wires of the subscriber loop are still used to couple the telephone handset to the local switching station.

More recently yet, voice telephone service has been implemented over the Internet. Advances in the speed of Internet data transmissions and Internet bandwidth have made it possible for telephone conversations to be communicated using the Internet's packet switched architecture and the TCP/IP protocol.

Software is available for use on personal computers which enable the two-way transfer of real-time voice information via an Internet data link between two personal computers (each of which is referred to as an end point or client), each end point computer includes appropriate hardware for driving a microphone and a speaker. Each end point operates simultaneously both as a sender of real time voice data and as a receiver of real time voice data to support a full duplex voice conversation. As a sender of real time voice data, the end point computer converts voice signals from analog format, as detected by the microphone, to digital format. The software then facilitates data compression down to a rate compatible with the end point computer's data connection to an Internet Service Provider (ISP) and facilitates encapsulation of the digitized and compressed voice data into a frame compatible with the user datagram protocol and internet protocol (UDP/IP) to enable communication to the other end point via the Internet.

As a receiver of real time voice data, the end point computer and software reverse the process to recover the analog voice information for presentation to the operator via the speaker associated with the receiving computer.

To promote the wide spread use of Internet telephony, the International Telephony Union (ITU) had developed a set of standards for Internet telephony. The ITU Q.931 standard relates to call signaling and set up, the ITU H.245 standard provides for negotiation of channel usage and compression capabilities between the two endpoints, and the ITU H.323 standard provides for real time voice data between the two end points to occur utilizing UDP/IP to deliver the real time voice data.

Additionally, the Internet Engineering Task Force (IETF) has developed a set of standards for initiating real time media data sessions known as the Session Initiation Protocol (SIP). SIP provides for UDP/IP messages to be exchanged between the two endpoints (or between the two endpoints and multiple proxy servers) to provide for call signaling and negotiation of compression capabilities.

A problem associated with standard ITU Internet telephony and with SIP Internet telephony is that network address translation (NAT) firewalls prevent the transmission of UDP/IP frames from an endpoint computer outside the firewall to an endpoint computer on a private network inside the firewall.

More specifically, both the ITU Internet telephony standards and the SIP standards provide for each endpoint to designate a real time protocol (RTP) channel, which comprises and IP address and port number, for receipt of media datagrams and to provide that RTP channel to the other end point.

Because the private network client does not have a globally unique IP address, a frame sent to such non-globally unique IP address can not be routed on the Internet and will be lost. Further, even if the private network client were able to identify and designate the IP address of the NAT firewall server, the private network client has no means for establishing a port on the NAT firewall for receipt of media datagrams.

Because of the wide spread use of NAT firewalls which typically provide both IP address translation and port translation of all frames sent from the private network to the Internet, what is needed is a system and method for establishing and maintaining Internet telephony conversations between two clients, both of which are located on private networks behind NAT firewalls. What is also needed is a system and method for establishing and maintaining Internet telephone conversations between a client located on a private network behind a NAT firewall and a client with an Internet routable IP address (e.g. public IP address on the Internet) that operates a receiving UDP channel that is different from its sending UDP channel.

SUMMARY OF THE INVENTION

A first aspect of the present invention is to provide a method of communicating real time media data between a first client and a second client. Both the first client and the second client may be located on separate private networks behind NAT firewalls and both may use the same UDP channel for both sending and receiving media datagrams. The method may be performed by an intermediary server with a public IP address on the Internet. The method comprises extracting a first client source network address from a first media datagram originated by the first client and extracting a second client source network address from a second media datagram originated by the second client. A third media datagram, that includes media data received from the second client, is sent to the first client source network address and a fourth media datagram, that includes media data sent by the first client, is sent to the second client source network address.

The first client source network address may comprise an Internet Protocol address and a port number of a firewall server supporting the first client and the second client source network address may comprise an Internet Protocol address and a port number of a firewall server supporting the second client. As such, the step of sending a third media datagram to the first client source network address may include sending the third media datagram to the Internet Protocol address and port number extracted from the first media datagram and the step of sending a fourth media datagram to the second client source network address may include sending the fourth media datagram to the Internet Protocol address and port number extracted from the second media datagram.

The method may further include establishing a first port number for receipt of the first media datagram and establishing a second port number for receipt of the second media datagram. The first port number and the second port number may be the same. An indication of the first port number may be provided to the first client and an indication of the second port number may be provided to the second client. The third media datagram may include the first port number as a source port number and the fourth media datagram may include the second port number as a source port number.

A second aspect of the present invention is to provide a method of communicating real time media data between a first client and a second client. Either (or both) of the first client and the second client may be behind firewall servers. Additionally, if either (or both) of the first client and the second client are not behind a firewall server, such client may use the same network address and port number (real time protocol channel) for both sending and receiving or may use separate real time protocol (RTP) channels for sending and receiving. The method of the second aspect will work with all such permutations.

The method comprises receiving an indication of a first client network address which includes an Internet Protocol address and port number for receiving media datagrams, receiving a first media data gram originated by the first client, and receiving a second media data originated by the second client. The first client network address may be compared to a first client source network address extracted from the first media datagram. If the Internet Protocol address of the first client network address is not the same as an Internet Protocol address from the network address extracted from the first media datagram, it can be concluded that the first client is behind a firewall server and that the network address extracted from the first media datagram is that of the firewall server. As such, a third media datagram, that includes media data originated by the second client, is sent to the first client using the first client source network address as a destination network address of the third media datagram.

Additionally, if the Internet Protocol address of the first client network address is the same as the Internet Protocol address from the network address extracted from the first media datagram, it can be concluded that the first client is not behind a firewall server and has a public IP address. As such, the method may further include sending a third media datagram, that includes media data originated by the second client, to the first client using the first client network address if the source network address and the first client network address are the same.

The method may also include establishing a first port number for receipt of the first media datagram. An indication of the first port number may be provided to the first client. The third media datagram may include the first port number as a source port number.

A third aspect of the present invention is to provide a device for relaying real time media data between a first client and a second client, both of which may be behind firewall servers. The device comprises a network interface circuit for communicating with each of the first client and the second client via a data network and a media communication application operatively coupled to the network interface circuit. The media communication application provides for extracting a first client source network address (Internet Protocol address and port number) from a media datagram originated by the first client and extracting a second client source network address (Internet Protocol address and port number) from a media datagram originated by the second client, both of which may be received by the network interface circuit. The media communication application further provides for driving the network interface circuit to send a third media datagram, that includes media data received from the second client, to the first client source network address and to send a fourth media datagram, that include media data received from the first client, to the second client source network address.

The first client source network address may comprise an Internet Protocol address of a firewall server supporting the first client and the second client source network address may comprise an Internet Protocol address of a firewall server supporting the second client.

The media communication application may further provide for establishing a first port number for receipt of the first media datagram and establishing a second port number for receipt of the second media datagram. The first port number and the second port number may be the same. The media communication application may drive the network interface circuit to provide an indication of the first port number to the first client and an indication of the second port number to the second client. The third media datagram may include the first port number as a source port number and the fourth media datagram may include the second port number as a source port number.

A fourth aspect of the present invention is to provide a device for relaying real time media data between a first client and a second client, independent of whether either or both of the first client and the second client are behind firewall servers, and, if located directly on the Internet, independent of whether such client uses the same RTP channel for both sending and receiving media datagrams. The device comprises a network interface circuit for communicating with each of the first client and the second client via a data network and a media communication application operatively coupled to the network interface circuit. The media communication application provides for: i) obtaining a first media datagram originated by the first client and received by the network interface circuit; ii) obtaining an indication of a first client network address that includes an Internet Protocol address and port number for use as a destination network address for sending media datagrams to the first client; iii) obtaining a second media datagram originated by the second client and received by the network interface circuit; iv) comparing the first client network address to a first client source network address extracted from the first media datagram; and v) driving the network interface circuit to send a third media datagram that includes media data originated by the second client using the first client source network address as a destination network address of the third media datagram if the Internet Protocol address of the first client network address and the Internet Protocol address of the first client source network address are not the same.

Further, the media communication application may provide for driving the network interface circuit to send a third media datagram that includes media data originated by the second client using the first client network address as a destination network address of the third media datagram if the Internet Protocol address of the first client network address and the Internet Protocol address of the source network address are the same.

The media communication application may further provide for establishing a first port number for receipt of the first media datagram and may drive the network interface circuit to provide an indication of the first port number to the first client. The third media datagram may include the first port number as a source port number.

DETAILED DESCRIPTION OF THE EXEMPLARY EMBODIMENTS

Figure 1:
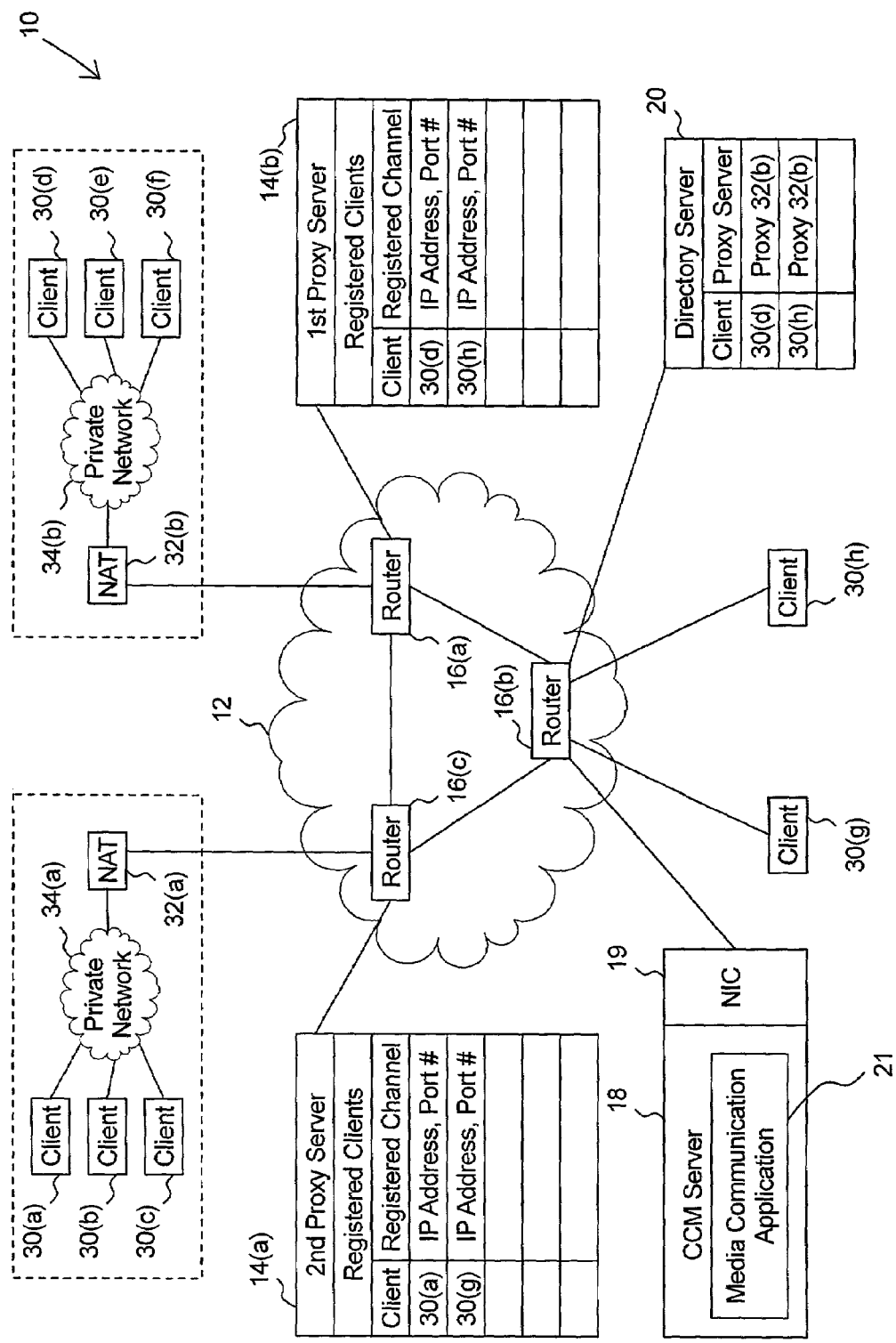
FIG. 1 is a bock diagram of a real time media communication network in accordance with one embodiment of this invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit as used throughout this specification is intended to encompass a hardware circuit (whether discrete elements or an integrated circuit block), a processor or control block executing code, or a combination of a hardware circuit(s) and a processor and/or control block executing code.

Referring to FIG. 1, a block diagram of a real time media communication network 10 is shown. The real time media communication network 10 includes a network 12 comprising a plurality of interconnected routers 16(a)–16(c) interconnecting a plurality of network devices. The network 12 may be the Internet. Throughout this application, the network 12 may be referred to as the "Internet", however, it should be appreciated this is for illustrative purposes only and does not limit the network 12 to the Internet or similar networks.

Coupled to the Internet 12, or more specifically coupled to one of the routers 16(a)–16(c), are a plurality of network devices which for purposes of this invention include real time media communication clients 30(g) and 30(h), proxy servers 14(a) and 14(b), a call control manager server (CCM) 18, a directory server 20, and a plurality of firewall servers 32(a) and 32(b).

Each of the network devices coupled to the Internet 12 is assigned a public Internet Protocol (IP) address. Frames of data are communicated between the various devices utilizing each devices IP address for routing the frames from a source device to a destination device. More specifically, a suite of protocols known as TCP/IP enables devices to set up TCP logical connections, and/or UDP logical channels, with each other utilizing each devices IP address and logical port number for purposes of exchanging data.

Each firewall server 32(a) and 32(b) may be a network address translation (NAT) server that operates as an IP layer proxy for devices coupled to each of a private network 34(a) and 34(b) respectively. Throughout this application, the firewall servers 32(a) and 32(b) may be referred to as "NAT Servers", however, it should be appreciated this is for illustrative purposes only and does not limit the structure of the firewall servers 32(a) and 32(b).

Each private network 34(a) and 34(b) may function in a similar manner to the Internet 12 using the TCP/IP protocols. However, the IP address assigned to each client 30(a)–30(f) on each of the private networks 34(a) and 34(b) may be an IP address selected from a block of IP addresses reserved for private networks. Addresses within the block of private network addresses are routable on the private network 34(a) [or 34(b)] but are not routable on the Internet 12.

IP frames on the private network 34(a) [or 34(b)] are routed to the appropriate device on private network 34(a) [or 34(b)] when the destination address is within the block of private network IP addresses. When the destination address is a "public" IP address on the Internet 12, the IP frame on the private network 34(a) [or 34(b)] is routed to the NAT server 32(a) [or 32(b)]. The NAT server 32(a) [or 32(b)] then emulates the destination device when communicating data over TCP/IP connections with the initiating client 30(a), 30(b), or 30(c) [30(d), 30(e) or 30(f)] and operates as an IP layer proxy, by performing both address translation and port translation, to exchange data using TCP/IP connections with the destination device, on behalf of the initiating client 30(a), 30(b), or 30(c) [30(d), 30(e) or 30(f)], over the Internet 12.

Further, the NAT server 32(a) [and 32(b)] may also be capable of translating connectionless datagrams sent by the initiating client 30(a), 30(b), or 30(c) [30(d), 30(e) or 30(f)] and forwarding such connectionless datagrams to the destination device over the Internet 12. And, if a connectionless datagram were to be replied to by the destination device and the reply datagram is 1) received at the NAT server 32(a) [or 32(b)] on the same port number as the NAT server 32(a) [or 32(b)] utilized when translating the connectionless datagram; 2) includes a source IP address and port number which matches the destination IP address and port number of the connectionless datagram; and 3) is received within a predefined time window following when the NAT server 32(a) [or 32(b)] sent the connectionless datagram, then the response datagram may be routed back to the initiating client 30(a), 30(b), or 30(c) [30(d), 30(e) or 30(f)] on the private network 34(a) [or 34(b)].

The NAT server 32(a) and 32(b) may maintain a translation table that maps the source address and port number of the initiating client 30(a), 30(b), or 30(c) [30(d), 30(e) or 30(f)] to the corresponding translated source address and port number for each TCP/IP connection opened (and UDP/IP connectionless datagram sent) by NAT server 32(a) [or 32(b)] on behalf of each initiating client 30(a), 30(b), or 30(c) [30(d), 30(e) or 30(f)]. As such, the NAT server 32(a) [and 32(b)] may utilize the translation table to relay a reply frame received over the Internet 12 back to the appropriate initiating client 30(a), 30(b), or 30(c) [30(d), 30(e) or 30(f)] on the appropriate port number.

For added security, each entry in the translation table may include the destination IP address and port number to which the translated frame was sent over the Internet 12. As such, the NAT server 32(a) [32(b)] is capable of verifying that a frame addressed to the translated IP address and port number is truly a reply frame from the device to which the translated frame was addressed.

Upon receipt of any frame from the Internet, the NAT server 32(a) [32(b)] will locate the one of the entries in the translation table to which the received frame corresponds utilizing the frames destination IP address and port number. The NAT server 32(a) [32(b)] may then verify that the frame is truly a reply frame by comparing the frame's source address and port number with the destination IP address and port number in the entry. If there is a match, the NAT server 32(a) [32(b)] will generate a reverse translated frame and forward the reverse translated frame to the initiating client 30(a), 30(b), or 30(c) [30(d), 30(e) or 30(f)] on the private network 34(a) [34(b)]. The reverse translated frame is the same as the reply frame except the destination IP address and port number are replaced with the initiating client 30(a), 30(b), or 30(c) [30(d), 30(e) or 30(f)] private network IP address and port number.

Each client 30(a)–30(h) whether on a private network 34(a) or 34(b) or directly coupled to the Internet 12 is configured to initiate (e.g. place) and terminate (e.g. receive) real time media communication sessions such as Internet telephony calls with a second client 30(a)–30(h).

More specifically, each client 30(a)–30(h) remains registered with one of the proxy servers 14(a) and 14(b). When initiating a media session the first client, client 30(a) for example, may provide the proxy server with which the first client 30(a) is registered, proxy server 14(a) for example, with identity of the second client to which it would like initiate a media session, client 30(d) for example. The proxy server 14(a) then interrogates the directory server 20 to determine with which proxy server the second client 30(d) is registered, proxy server 14(b) for example. The two proxy servers 14(a) and 14(b) then facilitate the exchange of messages for setting up the media session, for communicating other messages representing media session negotiation between each of the first client 30(a) and the second client 30(d), and for directing each of the first client 30(a) and the second client 30(d) to route media datagrams to the CCM server 18 during the media session. During the media session, the CCM server 18 operates to relay real time media data between the first client 30(a) and the second client 30(b).

Figure 2A:
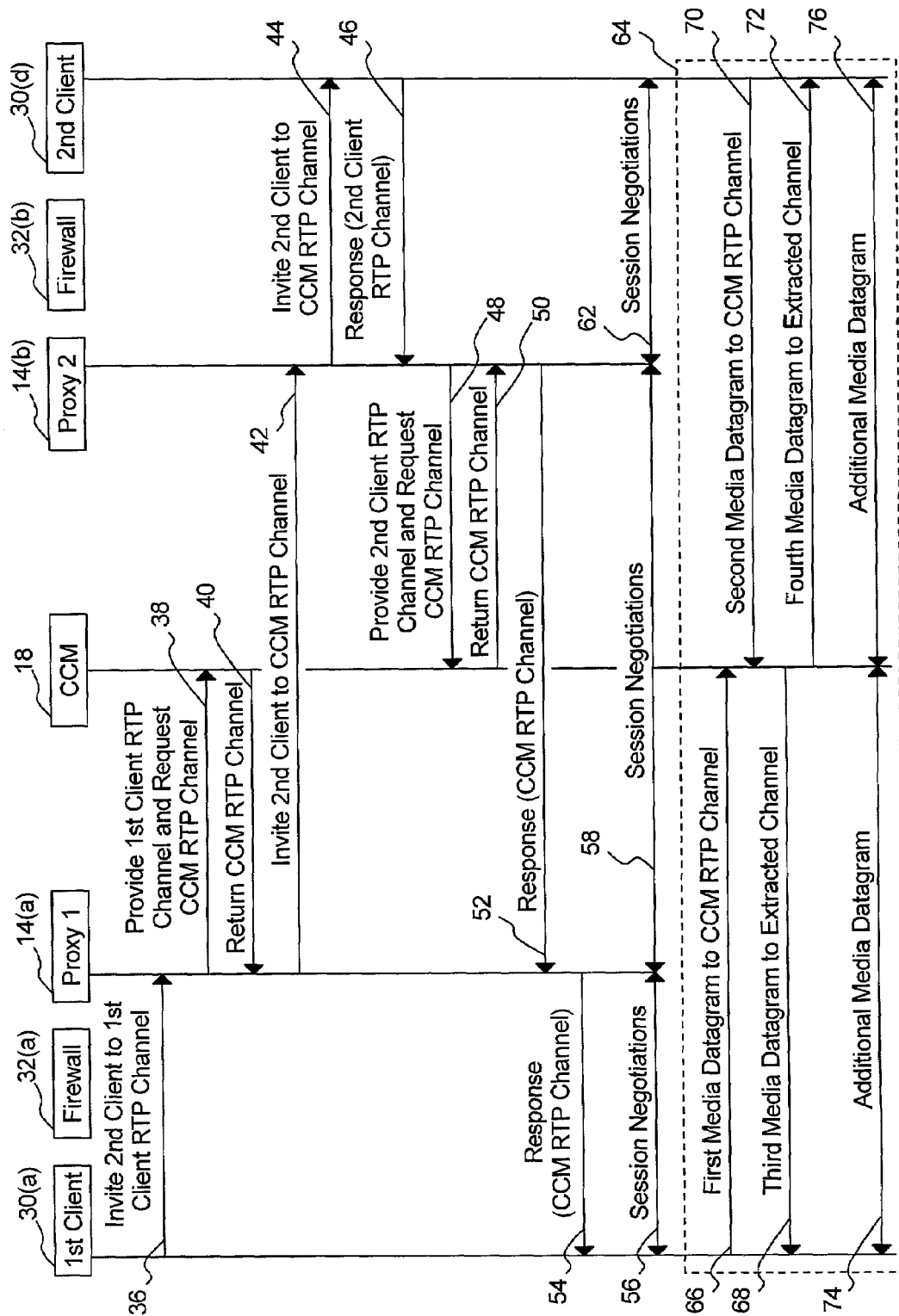
FIG. 2(a) is a ladder diagram of exemplary steps for performing real time media communication in accordance with one embodiment of this invention.

Referring to the ladder diagram of FIG. 2 in conjunction with FIG. 1, more detailed exemplary steps for real time media communication between the first client 30(a) and the second client 30(d) are shown.

Step 36 represents the first client 30(a) sending a media session signaling message to the proxy server 14(a) to which the first client 30(a) is registered. The media session signaling message may be a SIP compliant "Invite" message and may identify: 1) the second client 30(d) as the client with which the first client 30(a) would like to initiate a media session, and 2) a first client network address established by the first client 30(a) for receipt of media datagrams during the media session. The first client network address may include the IP address of the first client 30(a), which is a private network address, and a first client port number assigned to the media session by the first client 30(a).

It should be appreciated that a network address that includes an Internet Protocol address and a port number may be referred to as a real time protocol (RTP) channel. Throughout this specification, the terms network address and real time protocol channel are used interchangeably.

After receipt of the media session signaling message at step 36, step 38 represents the proxy server 14(a) providing the first client RTP channel to the CCM server 18 and requesting a CCM RTP channel for the media session from the CCM server 18. The CCM RTP channel may include the IP address of the CCM server 18 and a port number of the CCM server 18 assigned to the media session. Step 40 represents the CCM server 18 providing the CCM RTP channel to the proxy server 14(a).

At step 42 the proxy server 14(a) initiates a media session signaling message to the proxy server 14(b) with which the second client 30(d) is registered. The media session signaling message of step 42 again may be a SIP compliant Invite message and may identify: 1) second client 30(d) as the client with which the first client 30(a) would like to initiate a media session, and 2) the CCM RTP channel.

After the proxy server 14(b) receives the media session signaling message at step 42, the proxy server 14(b) sends a media session signaling message to the second client 30(d) at step 44. The media session signaling message sent to the second client identifies: 1) second client 30(d) as the client with which the first client 30(a) would like to initiate a media session, and 2) the CCM RTP channel.

It should be appreciated that because the second client 30(d) is on the private network 34(b) and can only communicate with the proxy server 14(b) through the NAT server 32(b), the proxy server 14(b) may not be able to initiate the sending of the media session signaling message to the second client 30(d) but instead may have to wait for the second client 30(b) to poll the proxy server 14(b) for the media session signaling message or to update its registration with the proxy server 14(b) such that the proxy server 14(b) can initiate the media session signaling message as a reply frame to the registration update frame such that the media session signaling message will be routed to the second client 30(d) through the NAT server 30(d).

Step 46 represents the second client 30(d) sending a response message back to the proxy server 14(b). The response may be a SIP compliant "Ringing" message and may identify a second client RTP channel for use sending media datagrams to the second client 30(d).

After receipt of the response message by the proxy server 14(b) at step 46, step 48 represents providing the CCM server 18 with the second client RTP channel and requesting a CCM RTP channel for the media session. Step 50 represents the CCM server 18 providing the CCM RTP channel to the proxy server 14(b).

At step 52, the proxy server 14(b) sends the response message back to the proxy server 14(a). This response message again may be an SIP compliant "Ringing" message and may identify the CCM RTP channel. The proxy server 14(a) then sends a response message, again identifying the CCM RTP channel, back to the first client 30(a) at step 54.

Steps 56, 58, and 62 represent the communication of datagrams representing additional media session negotiation between each of the first client 30(a) and the second client 30(d).

The steps within block 64 represent the exchange of media datagrams during the media session between each of the first client 30(a) and the second client 30(b) with the CCM server 18 operating as a relay server there between. More specifically, step 66 represents a first media datagram, addressed to the CCM RTP channel, being originated by the first client 30(a) and received by the CCM server 18. Because the first client 30 is coupled to the Internet 12 through the NAT server 32(a), the NAT server 32(a) translates the source IP address of the datagram from the private network IP address of the first client 30(a) to the public IP address of the NAT server 32(a) and translates the port number from the port number assigned by the first client 30(a) to a port number assigned by the NAT server 32(a).

After receipt of the first media datagram originated by the first client 30(a) at step 66, the CCM server 18 extracts a first client source network address (source Internet Protocol address and source port number). Because the CCM server 18 is not aware that the first client 30(a) is behind a NAT server 32(a) and because the CCM server 18 is able to work with clients that use different RTP channels for sending and receiving, the CCM server 18 may compare the first client source network address (specifically the source Internet Protocol address) to the network address from the Internet Protocol address of the first client RTP channel. Because of the translation, the extracted source Internet Protocol address will not match the Internet Protocol address of the first client RTP channel. At step 68 and step 74, media datagrams sent by the CCM to the first client 30(a) (referred to as third media datagrams for the sake of clarity) will be sent on an RTP channel defined by the extracted source network address such that the media datagrams will be routed to the first client 30(a) by the NAT server 32(a).

Similarly, step 70 represents a media datagram, addressed to the CCM RTP channel, being originated by the second client 30(d) and received by the CCM server 18. To distinguish this media datagram of step 70 from the media datagram of step 66, this media datagram of step 70 will be referred to as the second media datagram. However, it should be appreciated that the labeling of first and second is for clarity only and does indicate a time order. It is possible for the second media datagram of step 70 to occur prior to the first media datagram of step 66.

Because the second client 30(d) is coupled to the Internet 12 through the NAT server 32(b), the NAT server 32(b) translates the source network address of the datagram from the private network IP address of the second client 30(d) to the public IP address of the NAT server 32(b) and translates the port number from the port number assigned by the second client 30(d) to a port number assigned by the NAT server 32(b).

After receipt of the second media datagram at step 70, the CCM server 18 extracts a second client source network address comprising the source network Internet Protocol address and source port number from the media datagram and compares the extracted Internet Protocol address to the Internet Protocol address from the second client RTP channel. Again, because of the translation, the extracted source Internet Protocol address will not match the Internet Protocol address of the second client RTP channel. At step 72 and step 76, media datagrams sent by the CCM to the second client 30(d) (referred to as fourth media datagrams for sake of clarity) will be sent on an RTP channel defined by the extracted source network address such that the fourth media datagrams will be routed to the second client 30(d) by the NAT server 32(b).

Figure 3:
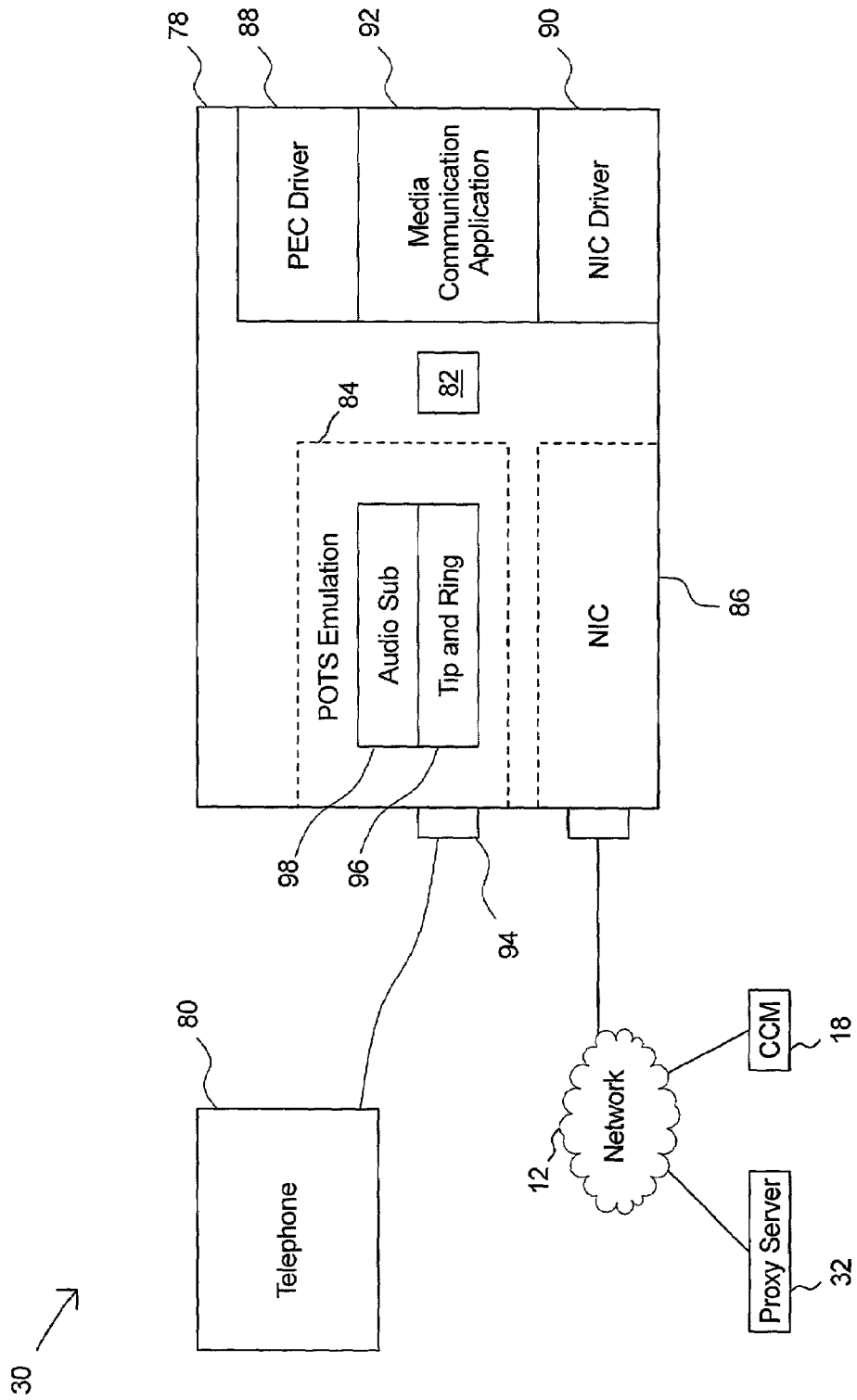
FIG. 3 is a block diagram of a client for performing real time media communication in accordance with one embodiment of this invention.

Referring to FIG. 3, a block diagram of an exemplary client 30 is shown. The client 30 may include a desk top computer 78 and a traditional plain old telephone server (POTS) telephone 80 coupled thereto. The desk top computer 78 may include a processing unit 82 for operating a POTS emulation circuit 84, a network interface circuit 86, a driver 88 for the POTS emulation circuit 84, a driver 90 for the network interface circuit 86, and a media communication application 92. Each of the POTS emulation circuit 84 and the network interface circuit 86 may be cards that plug into the computer expansion slots.

Alternatively, other configurations of a client 30 are envisioned which include all of the above systems embedded therein. Other configurations include, but are not limited to, an Internet telephony appliance structured as a network interface home telephone, a gaming device, or another consumer product with Internet telephony capabilities coupled to the Internet 12 (FIG. 1) via a wired or wireless connection such as the cellular telephone network, the PCS network, or other wide area RF network.

In the exemplary embodiment, the network interface circuit 86 and the network interface driver 90 together include the hardware and software circuits (including the IP stack) for operating the TCP/IP and UDP/IP protocols for communication on a TCP/IP compliant network.

The POTS emulation circuit 84 includes an RJ-11 female jack 94 for coupling the POTS telephone 80 to the POTS emulation circuit 84. The POTS emulation circuit 84 comprises a tip and ring emulation circuit 96 for emulating low frequency POTS signals on the POTS tip and ring lines for operating the telephone 80. The POTS emulation circuit 84 further includes an audio system 98 for interfacing the tip and ring emulation circuit 96 with the media communication application 92. More specifically, the audio system 98 provides for digitizing analog audio signals generated by the microphone in the telephone 80 (and provided to the POTS emulation circuit 84 on the tip and ring lines) and presenting a digital audio signal to the media communication application 92 (preferably by writing the digital audio data to memory using direct memory access systems). The audio system 98 simultaneously provides for receiving a digital audio signal from the media communication application 92 (representing audio data received from a remote client via the CCM server 18 (FIG. 1)), converting the digital audio signal to an analog audio signal, and coupling the analog audio signal to the tip and ring emulation circuit 96. The tip and ring emulation circuit 96 modulates the tip and ring lines for driving the speaker of the telephone 80 in accordance with the analog audio signal generated by the audio system 98.

Figure 4:
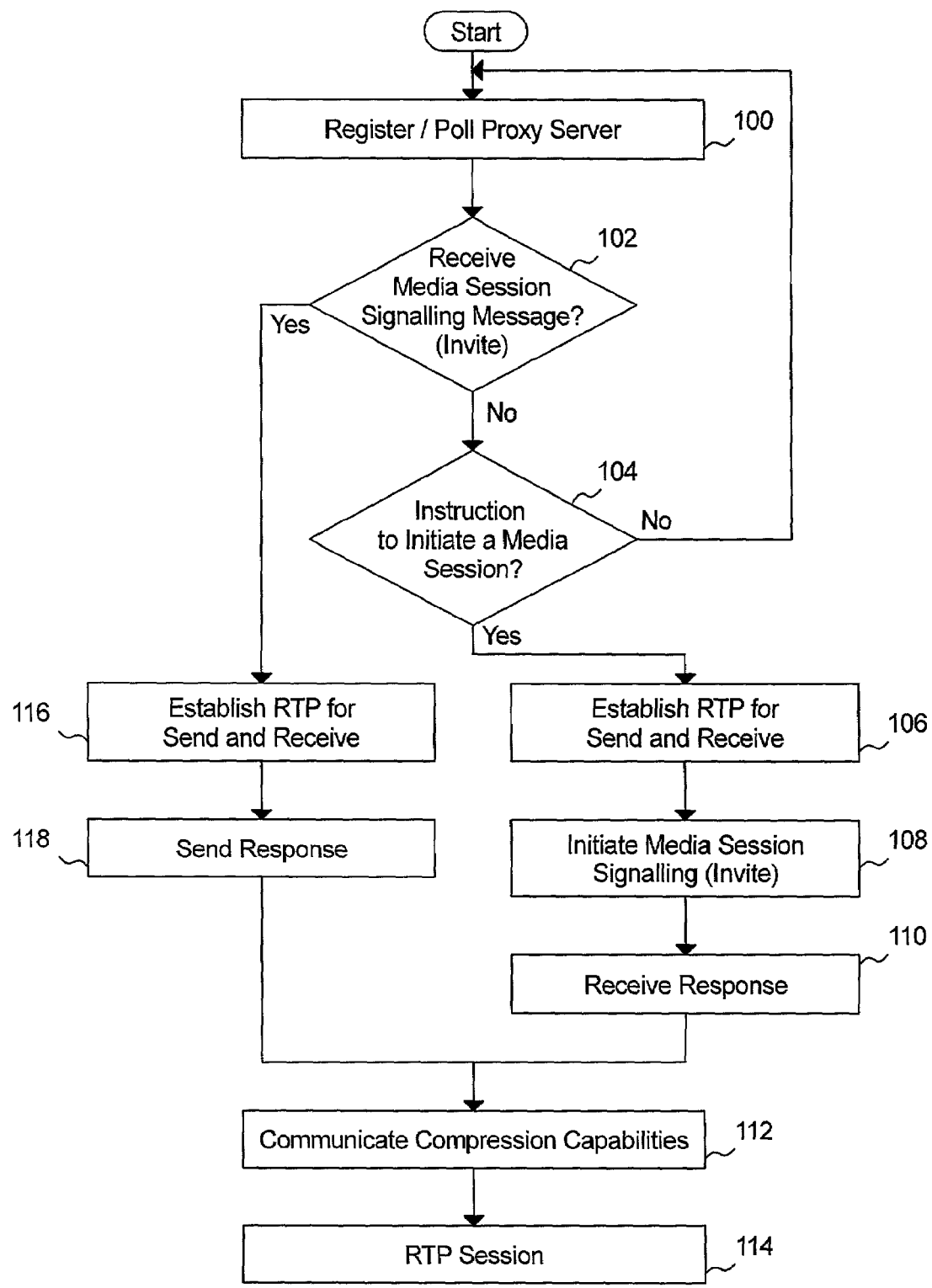
FIG. 4 is a flow chart showing exemplary steps performed by the client of FIG. 3 in accordance with one embodiment of this invention.

Referring to the flowchart of FIG. 4 in conjunction with the block diagram of FIG. 3, exemplary steps performed by the client 30 for media communication in accordance with this invention is shown. Step 100 represents registering with one of the proxy servers, proxy server 14(*a*) for example. Step 100 may also represent poling the proxy server 14(*a*) for any media session signaling messages from remote clients. The loop formed by steps 100, 102, and 104 represents waiting for either receipt of a media session signaling message at step 102 from the proxy server 14(*a*) or an instruction to initiate a media session from the operator at step 104.

If a media session signaling message is received at step 102, step 116 represents establishing the an RTP channel for both sending and receiving media datagrams during the media session and step 118 represents sending a response message back to the proxy server 14(*a*) which identifies the RTP channel. Step 118 corresponds to step 46 of FIG. 2.

Step 112 then represents additional session negotiation via the proxy server 14(*a*). Step 112 corresponds to steps 68 and 62 of FIG. 2. Thereafter, step 114 represents participating in the media session. More specifically, at step 114, the client 30 sends media datagrams (corresponding to the second media datagram of step 70 of FIG. 2 and the additional media datagrams of step 76 of FIG. 2) to the CCM RTP channel provided to the client 30 in the media session signaling message received at step 102. Further, at step 114, the client receives media datagrams (corresponding to the fourth media datagram of step 72 of FIG. 2 and the additional media datagrams of step 76 of FIG. 2) on the RTP channel established in step 116.

If an instruction to initiate a media session is received at step 104, step 106 represents establishing a RTP channel for both sending and receiving datagrams during the media session. Step 108 represents sending the invite message to the proxy server 14(*a*) identifying the remote client with which the operator desires to initiate a media session and identifying the RTP channel. Step 106 corresponds to step 36 of FIG. 2.

Step 110 represents receiving a response message back from the proxy server 14(*a*) which identifies the CCM RTP channel. Step 110 corresponds to step 54 of FIG. 2. Thereafter, when the client 30 is the initiating client, step 112 then represents communicating additional session negotiation messages via the proxy server 14(*a*). Step 112 corresponds to steps 56 and 58 of FIG. 2. Step 114 represents participating in the media session. More specifically, at step 114, the client 30 sends media datagrams (corresponding to the first media datagram of step 66 of FIG. 2 and the additional media datagrams of step 74 of FIG. 2) to the CCM RTP channel provided to the client 30 in the media session signaling message received at step 102. Further, at step 114, the client receives media datagrams (corresponding to the third media datagram of step 68 of FIG. 2 and the additional media datagrams of step 74 of FIG. 2) on the RTP channel established in step 116.

Figure 5:
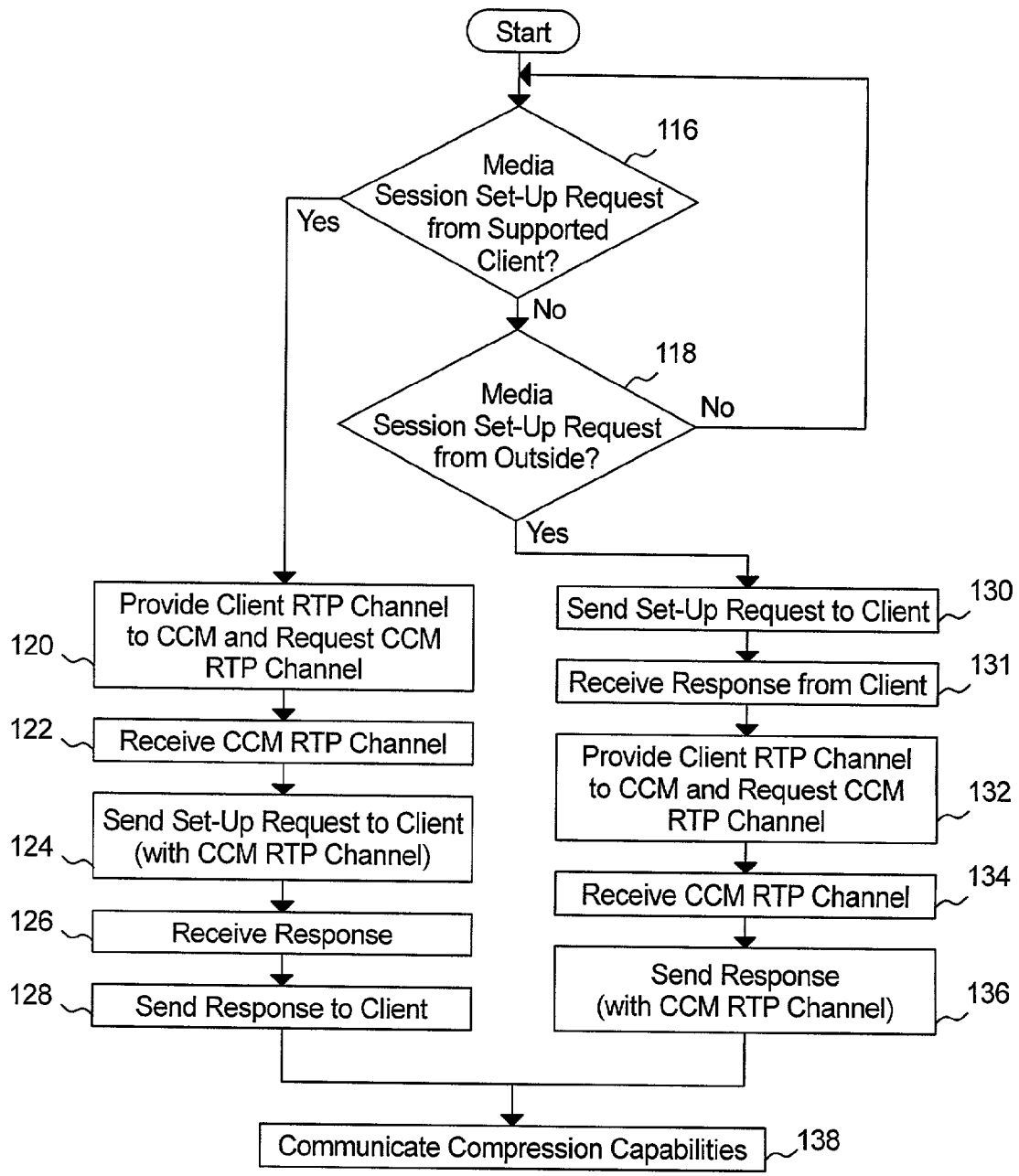
FIG. 5 is a flow chart showing exemplary steps performed by a proxy server in accordance with one embodiment of this invention.

Referring to FIG. 5, in conjunction with the block diagram of FIG. 1, exemplary steps performed by the proxy server 14(*a*) and 14(*b*) for media communication in accordance with this invention are shown.

The loop formed by steps 116 and 118 represents waiting for either a media session signaling message from a supported client at step 116 (corresponding to step 36 of FIG. 2) or a media session signaling message from a remote proxy server at step 118 (corresponding to step 42 of FIG. 2).

If a media session signaling message is received at step 116, step 120 represents providing the RTP channel from the media session signaling message to the CCM server 18 and requesting a CCM RTP channel. Step 120 corresponds to step 38 of FIG. 2. Step 122 represents receiving the CCM RTP channel from the CCM server and step 124 represents sending a signaling request to the proxy server with which the remote client (identified in the media session signaling message received at step 116) is registered. Step 112 corresponds to step 40 of FIG. 2 and step 124 corresponds to step 42 of FIG. 2.

Step 126 represents receiving a response message back from the remote proxy server and step 128 represents sending a response message back to the client. Step 126 corresponds to step 52 of FIG. 2 and step 128 corresponds to step 54 of FIG. 2. Step 138 then represents exchanging additional session negotiation messages. Step 138 corresponds to steps 56 and 58 of FIG. 2.

If at step 118 a media session signaling request is received from a remote proxy, step 130 represents forwarding the media session signaling request to the client identified in the media session signaling request received at step 118. Step 118 corresponds to step 42 of FIG. 2 and step 130 corresponds to step 44 of FIG. 2. Step 131 represents receipt of a response message back from the client 30, corresponding to step 46 of FIG. 2.

Step 132 represents providing the client RTP channel from the response message received at step 131 to the CCM server 18 and requesting a CCM RTP channel. Step 134 represents receiving the CCM RTP channel. Step 132 corresponds to step 48 of FIG. 2 and step 134 corresponds to step 50 of FIG. 2.

Step 136 represents sending a response message that includes the CCM RTP channel back to the proxy server from which the media session signaling message was received at step 118. Step 136 corresponds to step 52 of FIG. 2.

Step 138 again represents exchanging session negotiation messages and corresponds to steps 58 and 62 of FIG. 2.

Figure 6A:
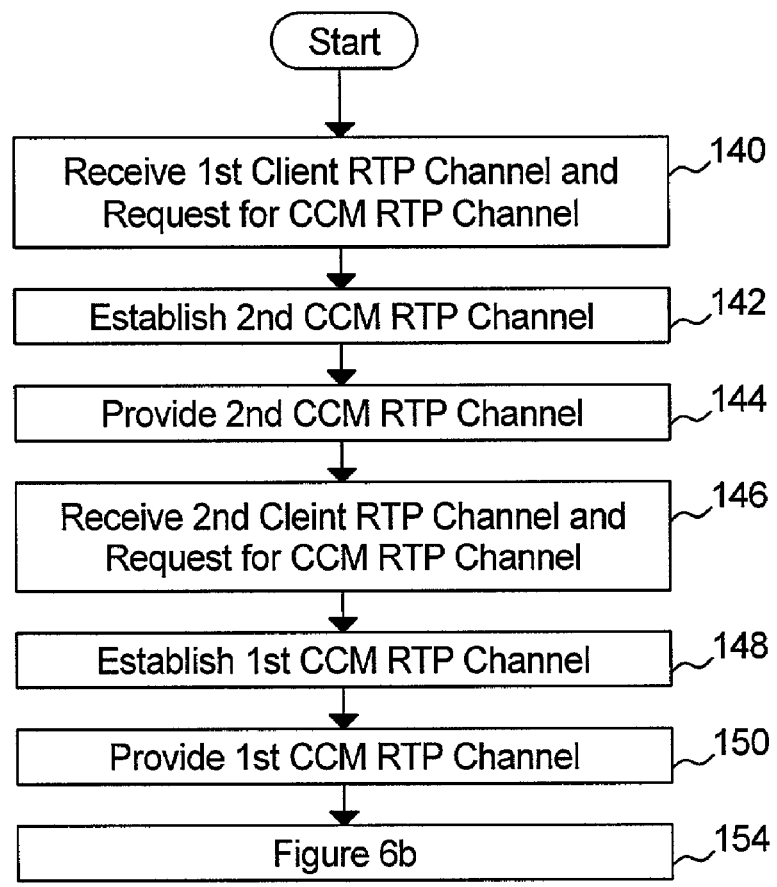
FIG. 6a is a flow chart showing exemplary steps performed by a call control manager server in accordance with one embodiment of this invention.
Figure 6B:
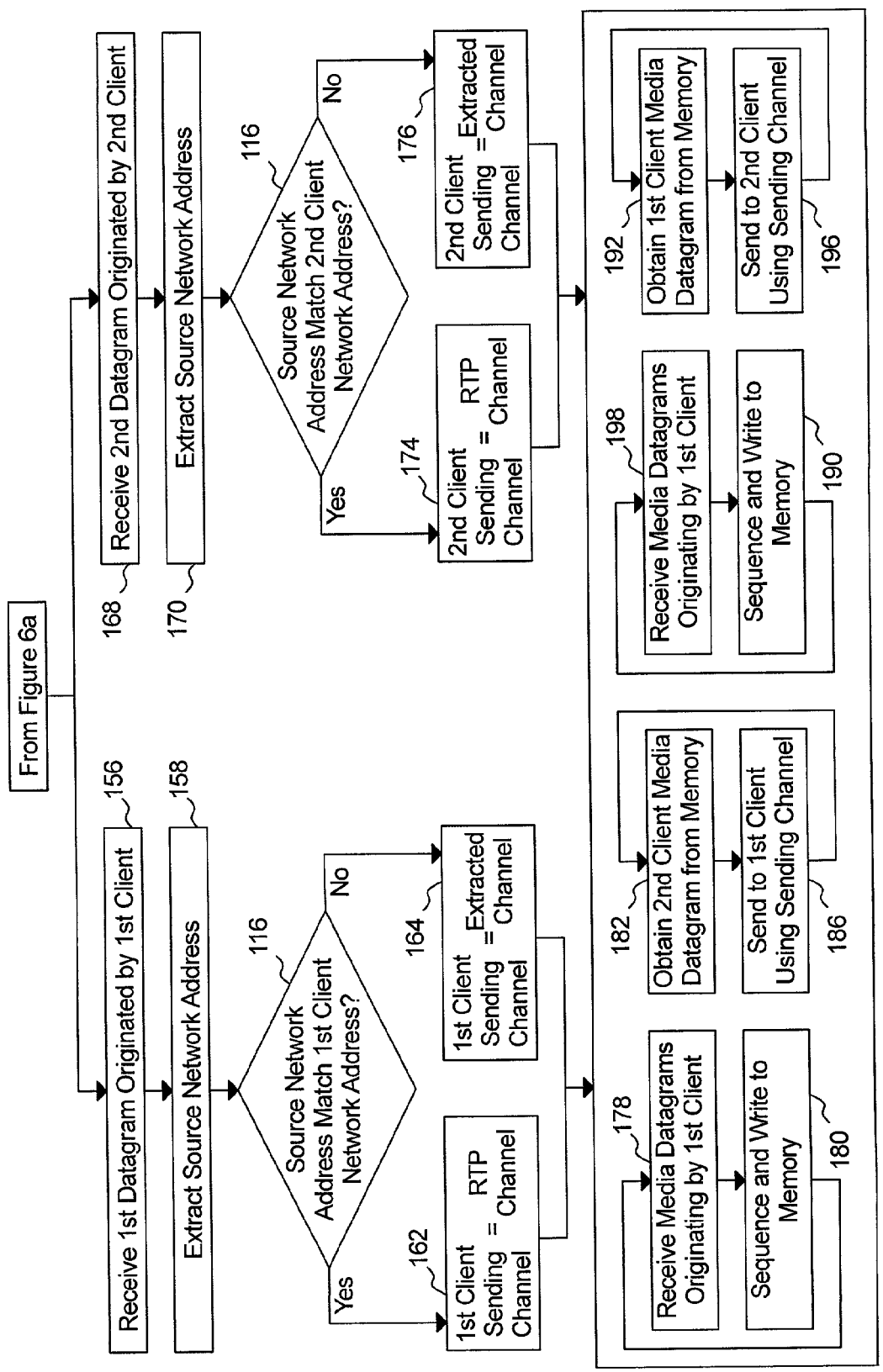
FIG. 6b is a flow chart showing exemplary steps performed by a call control manager server in accordance with one embodiment of this invention.

Referring to FIG. 6*a* and FIG. 6*b*, in conjunction with the block diagram of FIG. 1, operation of the CCM server 18 for media communication in accordance with this invention is shown.

The CCM server 18 comprises a network interface circuit 19 for communicating datagrams with other network devices coupled to the Internet 12 and with the clients 30(*a*)–30(*f*) coupled to one of the private networks 34(*a*) and 34(*b*) through one of the NAT servers 32(*a*) and 32(*b*) respectively. A media communication application is operatively coupled to the network interface circuit. In operation, the CCM server 18 operates in accordance with the flow charts of FIG. 6*a* and FIG. 6*b*.

Step 140 represents receiving a first client RTP channel and a request for a CCM RTP channel for a media session from a proxy server, proxy server 14(*a*) for example. Step 140 corresponds to step 38 of FIG. 2. Step 142 represents establishing a CCM RTP channel (including the public IP address of the CCM server 18 and a port number) for the media session and step 144 represents providing the CCM RTP channel back to the proxy server 14(*a*). Step 144 corresponds to step 46 of FIG. 2. The CCM RTP channel established at step 142 will be used for receiving the second media datagram at step 70 (and for sending the fourth media datagram at step 72 of FIG. 2) and for simplicity can be referred to as a second CCM RTP channel (and the port number as a second port number).

Step 146 represents receiving a second client RTP channel and a request for a CCM RTP channel for the media session. Step 148 represents establishing a CCM RTP channel (including the IP address of the CCM server 18 and a port number) and step 150 represents providing the second CCM RTP channel to the proxy server making the request, proxy server 14(*b*) for example. Step 146 corresponds to step 48 of FIG. 2 and step 148 corresponds to step 50 of FIG. 2. Similarly, the CCM RTP channel established at step 148 will be used for receiving the first media datagram at step 66 of FIG. 2 (and sending the third media datagram at step 68 of FIG. 2) and for simplicity can be referred to as a first CCM RTP channel (and the port number as a first port number). The first port number and the second port number may be the same.

Step 154 represents the beginning of the media session corresponding to block 65 of FIG. 2. Step 156 represents receiving the first media datagram from the first client 30(*a*) and step 158 represents extracting the first client source network address (source Internet Protocol address and source port number) from the first media datagram. Step 160 represents comparing the extracted source network address to the first client network address received as part of the first client RTP channel in step 140 from the proxy server 14(*a*). If the source network address does not match the first client network address, a sending address for sending media datagrams to the first client 30(*a*) is established to be the extracted RTP channel (extracted network address and extracted source port number).

Alternatively, if the extracted network address matches the network address from the first client RTP channel received at step 140, the sending address for sending media datagrams to the first client 30(*a*) is established to be the first client RTP channel.

During the same period of time when the CCM server 18 is performing steps 156 through 164 with respect to the first client 30(*a*), it is also performing steps 168 through 176 with respect to the second client 30(*d*).

Step 168 represents receiving the second media datagram from the second client 30(*d*) and step 170 represents extracting the source network address and source port number from the second media datagram. Step 172 represents comparing the extracted source network address to the network address from the second client RTP channel received in step 146 from the proxy server 14(*b*). If the source network address does not match the second client network address, a second client sending address for sending media datagrams to the second client 30(*d*) is established to be the extracted RTP channel (extracted network address and extracted source port number).

Alternatively, if the extracted network address matches the network address from the second client RTP channel received at step 146, the second client sending address for sending media datagrams to the second client 30(*d*) is established to by the second client RTP channel.

Thereafter at step 166 the media session is maintained with the CCM server 18 operating as a relay. More specifically, media datagrams are received from the first client at step 178 and are sequenced and written to memory at step 180. During the same time period, media datagrams are received from the second client at step 198 and are sequenced and written to memory at step 190.

Also occurring during the same time period, media data received from the second client 30(*d*) is retrieved from memory and sent to the first client 30(*a*) using the first client sending channel which, in the case of client 30(*a*) will be the extracted RTP channel, at step 186. Similarly, media data received from the first client is retrieved from memory and sent to the second client 30(*d*) using the second client sending channel which, in the case of client 30(*d*) will be the extracted RTP channel, at step 196.

It should be appreciated that because the CCM server 18 includes step 160 and step 172 which provide for comparing the extracted network address to the network address of the RTP channel provided by each clients corresponding proxy server, the CCM server 18 will operate with a client that has a public IP address and does not use the same RTP channel for both sending and receiving media datagrams during the media session. For example, assume a client, client 30(*h*) for example, with a public IP address uses a first port for sending media datagrams and a second port for receiving media datagrams. As such, the RTP channel provided to the CCM server 18 will include the public IP address and the second port. However, the extracted RTP channel will include the public IP address and the first port. Because the IP address match, the CCM server will establish the client sending channel as the RTP channel provided to the CCM server 18 such that the client will be able to receive media datagrams on the second port.

Figure 2B:
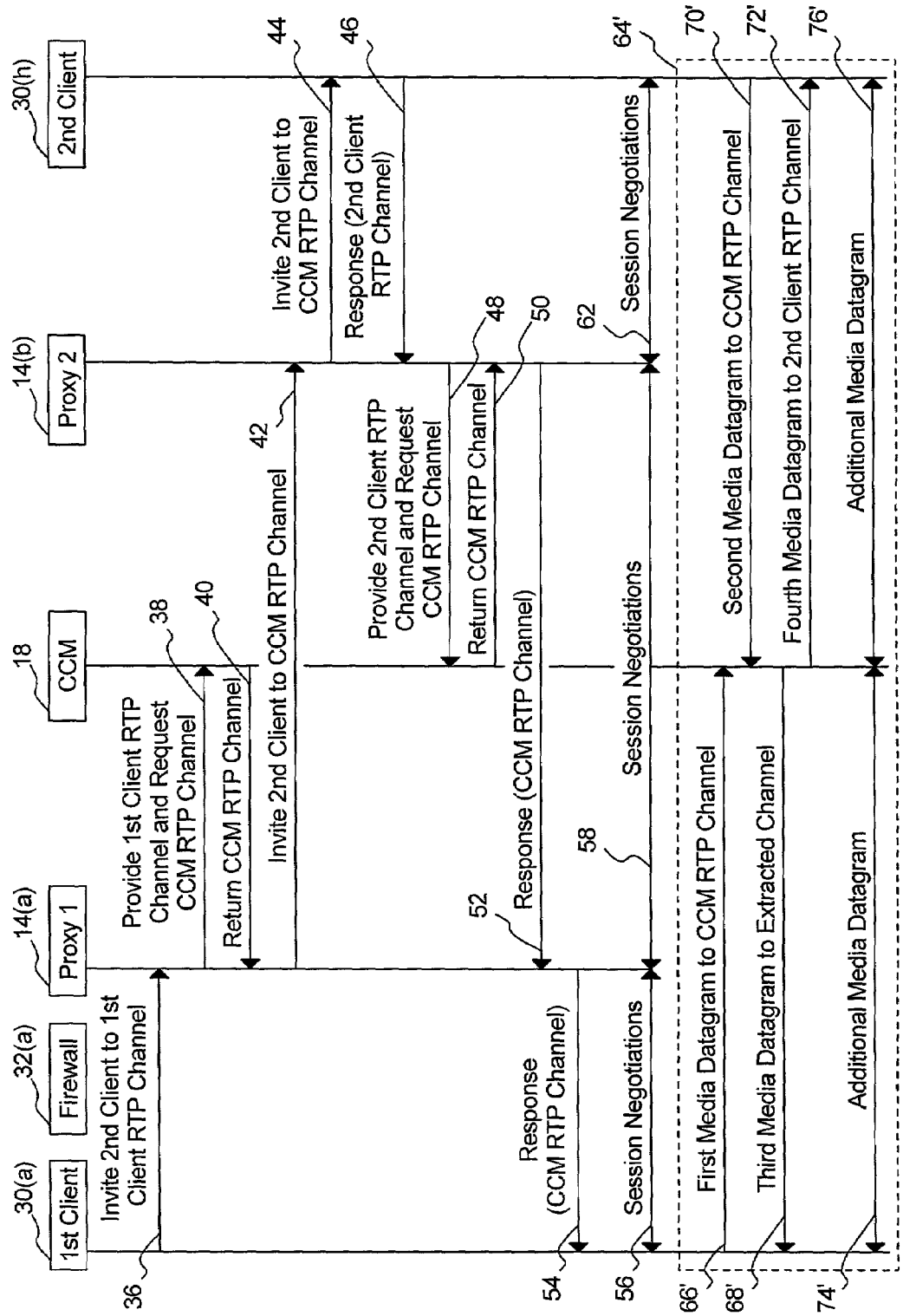
FIG. 2(b) is a ladder diagram of exemplary steps for performing real time media communication in accordance with another embodiment of this invention.

More specifically, referring to the ladder diagram of FIG. 2*b* in conjunction with FIG. 1, exemplary steps for media communication between a first client supported by a NAT server, client 30(*a*) for example, and a second client 30(*h*) that is directly coupled to the Internet 12 and may (or may not) use the same RTP channel for sending and receiving. It can be seen that steps 36 through 62 are the same as discussed with reference to FIG. 2(*a*).

However, the steps within block 64' will be different because the CCM server will detect that the IP address extracted from the second media datagram received at step 70' will be the same IP address as that provided to the CCM server at step 48. As such, the fourth media datagram at step 72' and the additional media datagrams at step 76' will be sent to the RTP channel provided to the CCM server at step 48.

Figure 2C:
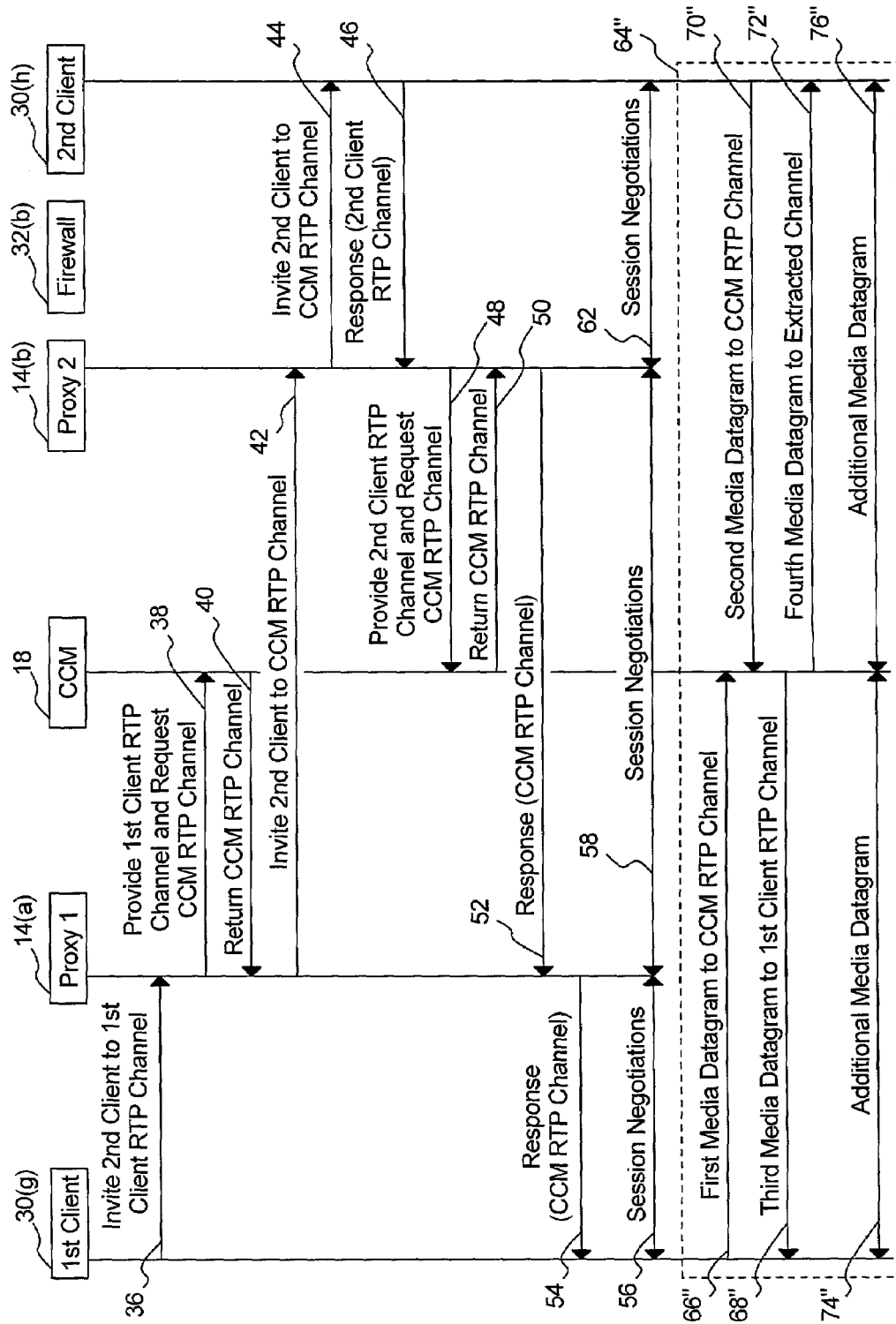
FIG. 2(c) is a ladder diagram of exemplary steps for performing real time media communication in accordance with yet another embodiment of this invention.

Similarly, the ladder diagram of FIG. 2*c* represents exemplary steps for media communication between a first client directly coupled to the Internet 12, client 30(*g*) for example, and a second client supported by a NAT server, client 30(*b*) for example, are shown. Again, client 30(*g*) may (or may not) use the same RTP channel for both sending and receiving. Again, it can be seen that steps 36 through 62 are the same as discussed with reference to FIG. 2(*a*) and again it will be seen that the steps within block 64" will be different because the CCM server will detect that the IP address extracted from the first media datagram received at step 66" will be the same IP address as that provided to the CCM server at step 38. As such, the third media datagram at step 68" and the additional media datagrams at step 74" will be sent to the RTP channel provided to the CCM server at step 48.

In summary, the above described systems and methods provide for real time media communication between two clients if one or both of the clients have a private network address and are coupled to the Internet by a firewall server performing address translation and port translation.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A method of operating a server for communicating real time media data between a first client and a second client, the method comprising:
   a) receiving a first RTP channel request from a first proxy server with which the first client is registered, the first proxy server generating the RTP channel request in response to receiving a first invite signaling message from the first client;
   b) establishing a first RTP channel to support relay of a media session between the first client and the second client and providing an indication of the first RTP channel to the first proxy server in response to receiving the first RTP channel request;
   c) receiving a second RTP channel request from a second proxy server with which the second client is registered;
   d) establishing a second RTP channel to support relay of the media session between the first client and the second client and providing an indication of the second RTP channel to the second proxy server in response to the second RTP channel request;
   e) receiving a second media datagram originated by second client and addressed to the first RTP channel by the second client, the first RTP channel being communicated to the second client by;
      the first proxy server sending a second invite signaling message to the second proxy server, the second invite signaling message indicating the first RTP channel as a destination to which the second client is to address media datagrams; and
      the second proxy server sending a third invite signaling message to the second client, the third invite signaling message indicating the first RTP channel as the destination to which the second client is to address media datagrams;
   f) receiving a first media datagram originated by the first client and addressed to the second RTP channel, the second RTP channel being communicated to the first client by;
      the second proxy server sending a response signaling message to the first proxy server, the response signaling message indicating the second RTP channel as a destination to which the first client is to address media datagrams; and
      the first proxy server sending a second response signaling message to the first client, the second response signaling message indicating the second RTP channel as the destination to which the first client is to address media datagrams;
   g) extracting a first client source network address from the first media datagram originated by the first client;
   h) extracting a second client source network address from the second media datagram originated by the second client;
   i) sending a third media datagram to the first client source network address, wherein the third media datagram includes media data from media datagrams received from the second client on the first RTP channel; and
   j) sending a fourth media datagram to the second client source network address, wherein the fourth media datagram includes media data from media datagrams received from the first client on the second RTP channel.

2. The method of operating a server for communicating real time media data of claim 1, wherein:
   a) the first client source network address comprises an Internet Protocol address of a firewall server supporting the first client;
   b) the second client source network address comprises an Internet Protocol address of a firewall server supporting the second client;
   c) the method further comprises:
      extracting a source port number from the second media datagram originated by the second client; and
      extracting a source port number from the first media datagram originated by the first client;
   d) the step of sending a third media datagram to the first client source network address includes sending the third media datagram to the source port number extracted from the first media datagram; and
   e) the step of sending a fourth media datagram to the second client source network address includes sending the fourth media datagram to the source port number extracted from the second media datagram.

3. The method of operating a server for communicating real time media data of claim 2, wherein:
   a) the first RTP channel comprises an IP address of the server and a first port number; and
   b) the second RTP channel comprises the IP address of the server and a second port number.

4. The method of operating a server for communicating real time media data of claim 3, wherein the first port number and the second port number are the same.

5. The method of operating a server for communicating real time media data of claim 3, wherein:
   the step of sending a third media datagram to the first client source network address further includes sending the third media datagram from the second RTP channel comprising the IP address of the server and the second port number; and
   the step of sending a fourth media datagram to the second client source network address further includes sending the fourth media datagram from the first RTP channel comprising the IP address of the server and the first port number.

6. The method of operating a server for communicating real time media data of claim 1, wherein:
   a) the first RTP channel comprises an IP address of the server and a first port number; and
   b) the second RTP channel comprises the IP address of the server and a second port number.

7. The method of operating a server for communicating real time media data of claim 6, wherein the first port number and the second port number are the same.

8. The method of operating a server for communicating real time media data of claim 5, wherein:
   the step of sending a third media datagram to the first client source network address forth includes sending the third media datagram from the second RTP channel comprising the IP address of the server and the second port number; and
   the step of sending a fourth media datagram to the second client source network address further includes sending the fourth media datagram from the first RTP channel comprising the IP address of the server and the first port number.

9. A device for relaying real time media data between a first client and a second client, the device comprising:
   a) a network interface circuit for communicating with each of the first client and the second client via a data network;
   b) a media communication application operatively coupled to the network interface circuit for;
      i) receiving a first RTP channel request from a first proxy server with which the first client is registered, the first proxy server generating the RTP channel request in response to receiving a first invite signaling message from the first client;
      ii) establishing a first RTP channel to support relay of a media session between the first client and the second client and providing an indication of the first RTP channel to the first proxy server in response to receiving the first RTP channel request;
      iii) receiving a second RTP channel request from a second proxy server with which the second client is registered;
      iv) establishing a second RTP channel to support relay of the media session between the first client and the second client and providing an indication of the second RTP channel to the second proxy server in response to the second RTP channel request;
      v) receiving a second media datagram originated by second client and addressed to the first RTP channel by the second client, the first RTP channel being communicated to the second client by;
         the first proxy server sending a second invite signaling message to the second proxy server, the second invite signaling message indicating the first RTP channel as a distination to which the second client is to address media datagrams; and
         the second proxy server sending a third invite signaling message to the second client, the third invite signaling message indicating the first RTP channel as the destination to which the second client is to address media datagrams;
      vi) receiving a first media datagram originated by the first client and addressed to the second RTP channel, the second RTP channel being communicated to the first client by;
         the second proxy server sending a response signaling message to the first proxy server, the response signaling message indicating the second RTP channel as a distination to which the first client is to address media datagrams; and
      the first proxy server sending a second response signaling message to the first client, the second response signaling message indicating the second RTP channel as the destination to which the first client is to address media datagrams;
      vii extracting a first client source network address from the first media datagram originated by the first client and received by the network interface circuit;
      viii extracting a second client source network address from the second media datagram originated by the second client and received by the network interface circuit;
      ix driving the network interface circuit to send a third media datagram to the first client source network address, wherein the third media datagram includes media data from media datagrams received from the second client on the first RTP channel; and
      x driving the network interface circuit to send a fourth media datagram to the second client source network address, wherein the fourth media datagram includes media data from media datagrams received from the first client on the second RTP channel.

10. The device for relaying real time media data between a first client and a second client of claim 9, wherein:
   i) the first client source network address comprises an Internet Protocol address of a firewall server supporting the first client;
   ii) the second client source network address comprises an Internet Protocol address of a firewall server supporting the second client;
   iii) the media communication application further comprises;
      extracting a source port number from the second media datagram originated by the second client; and
      extracting a source port number from the first media datagram originated by the first client;
   iv) the step of driving the network interface circuit to send a third media datagram to the first client source network address includes sending the third media datagram to the source port number extracted from the first media datagram; and
   v) the step of driving the network interface circuit to send a fourth media datagram to the second client source network address includes sending the fourth media datagram to the source port number extracted from the second media datagram.

11. The device for relaying real time media data of claim 10, wherein:
   a) the first RTP channel comprises an IP address of the device for relaying real time media data and a first port number; and
   b) the second RTP channel comprises the IP address of the device for relaying real time media data and a second port number.

12. The device for relaying real time media data of claim 11, wherein the first port number and the second port number are the same.

13. The device for relaying real time media data of claim 11, wherein:
   driving the network interface circuit to send a third media datagram to the first client source network address further includes sending the third media datagram from the second RTP channel comprising the IP address of the server and the second port number; and
   driving the network interface circuit to send a fourth media datagram to the second client source network address further includes sending the fourth media datagram from the first RTP channel comprising the IP address of the server and the first port number.

14. The device for relaying real time media data of claim 9, wherein:
   a) the first RTP channel comprises an IP address of the device for relaying real time media data and a first port number; and
   b) the second RTP channel comprises the IP address of the device for relaying real time media data and a second port number.

15. The device for relaying real time media data of claim 14, wherein the first port number and the second port number are the same.

16. The device for relaying real time media data of claim 14, wherein:
   driving the network interface circuit to send a third media datagram to the first client source network address further includes sending the third media datagram from the second RTP channel comprising the IP address of the server and the second port number; and driving the network interface circuit to send a fourth media datagram to the second client source network address further includes sending the fourth media datagram from the first RTP channel comprising the IP address of the server and the first port number.

* * * * *